United States Patent [19]

Jousson

[11] 4,160,466
[45] Jul. 10, 1979

[54] FLEXIBLE MULTI-CONDUIT TUBE AND ITS MANUFACTURE

[75] Inventor: Pierre J. Jousson, Geneva, Switzerland

[73] Assignee: Les Produits Associates LPA SA, Geneva, Switzerland

[21] Appl. No.: 755,216

[22] Filed: Dec. 29, 1976

[30] Foreign Application Priority Data

Feb. 24, 1976 [CH] Switzerland .......................... 2242/76

[51] Int. Cl.² ............................................. F16L 11/04
[52] U.S. Cl. .................................... 138/115; 138/118; 138/178
[58] Field of Search ................................ 138/111–117, 138/118, 178

[56] References Cited

U.S. PATENT DOCUMENTS

| | | | |
|---|---|---|---|
| 3,117,596 | 1/1964 | Kahn | 138/111 |
| 3,487,858 | 1/1970 | Hanback | 138/118 |
| 4,069,881 | 1/1978 | Shiber | 138/178 |

*Primary Examiner*—Houston S. Bell, Jr.

[57] ABSTRACT

An improved assembly of flexible multi-conduit tubing, and a method for the manufacture thereof are disclosed. The assembly provides a multiple conduit tube which is preformed in a specific helical shape to reduce bulk and to automatically return to shape without risk of tangling of the turns. This configuration is accomplished by winding the flexible tube in the helicoidal groove of a screw, and subjecting it to the proper heat treatment.

6 Claims, 3 Drawing Figures

FLEXIBLE MULTI-CONDUIT TUBE AND ITS MANUFACTURE

BACKGROUND OF THE INVENTION

1. Field of the Invention

The invention concerns a specific configuration of multiple-conduit tubing, and a method of preforming this tubing for use with known body-care apparatus which include a hydraulic motor with a turbine, piston or membrane, operating with a liquid under pressure coming from a pump via a flexible tube to drive a working instrument, notably a toothbrush or to supply a spray nozzle by means of a by-pass valve.

2. Brief Description of the Prior Art

With apparatus of this type, it is generally advantageous to have not only a conduit for the water supply of the handpiece, but also a second exhaust conduit and for this reason it is known to use a double tube of plastic material having two juxtaposed conduits, which tube is available on the market, and which is then preformed so that when it is not used it takes the shape of a helix so as to reduce its bulk and avoid its becoming tangled. The double tube is made in a material which can be formed by the action of heat, notably, a synthetic resin, such as polyethylene based or nylon.

Preforming of the tube into a pipe has been carried out to date by means of a cylindrical support with a smooth surface on which the double tube is helically wound, the larger face or "larger side" applying naturally against the surface of the support whereas the turns apply against one another by the tube edge or "small side".

Then the assembly is heated for example in hot water at, in the case of polyethylene, a temperature of about 95° C. for 1 to 2 minutes and then the tube is immersed in cold water, these figures of course depending on the type of plastic used. One thus obtains a preforming of the tube in a helix or coil to which the tube returns automatically when it is not submitted to a traction. There are also known casings of hydraulic body care apparatus which have a suitable recess in which said tube in helical configuration may be stored.

However, if this preforming has been carried out in such a manner that the joining line between the axes of the two conduits is parallel to the axis of the cylindrical support during the winding so that the length of the helix thus formed by the preformed tube is equal to the number of turns multiplied by the large side of the tube, as a result this helix has on the one hand a fairly great bukl and on the other hand the winding is not regularly and automatically formed since, as has been emphasized above, the turns are applied against one another by the small sides of the tube and there is a great risk that during the automatic winding under the action of the elastic force, the turns slide in or on one another and thus form an irregular winding.

If to date one has proceeded as has just explained, this is because during winding of the tube on the cylindrical support it is not possible to avoid that the large side of the tube comes naturally to bear against the surface of the support.

SUMMARY OF THE INVENTION

The present invention proposes to provide a multiple conduit tube, in particular a double tube of the above mentioned tube which is preformed in such a manner, that it has a reduced bulk and its automatic returing to shape takes place without a risk of tangling of the turns by sliding against one another.

To this end, the method according to the invention is characterized by the fact that the flexible tube is wound in the helicoidal groove of a screw, the depth of this groove corresponding at least approximately to the large side of the tube whereas its width is at least approximately equal to said small side.

Moreover, according to a preferred form of the invention, to obtain an axial prestressing in such a manner that in the rest state the turns apply against one another, after having helically preformed the tube and having separated it from the screw, one reverses the direction of winding of its turns.

The invention also concerns the means for carrying out the method, characterized by the fact that the helicoidal groove of the screw has a rounded bottom in a manner to mate with the shape of the tube.

The invention also concerns the tube obtained which is characterized by the fact that it is wound on its small side.

BRIEF DESCRIPTION OF THE DRAWINGS

The accompanying drawing shows, by way of example, an embodiment of the present invention.

DETAILED DESCRIPTION OF THE INVENTION

One uses a double-conduit tube 1 of plastic material available on the market. These double tubes are generally made by extrusion with two nozzles which form two flexible cylindrical tubes which are then tangentially assembled by welding or chemical means. There also exist double-conduit tubes manufactured directly by extrusion by means of a suitable nozzle, this type of tube generally having a flattened elliptical shape. In the example shown in the figures, a double tube of the first described type is used, comprising two juxtaposed cylindrical conduits 10, 11 adapted for the aforementioned hydraulic apparatus comprising a handpiece provided with a hydraulic motor connected by said tube to a supply pump.

Figure 1:
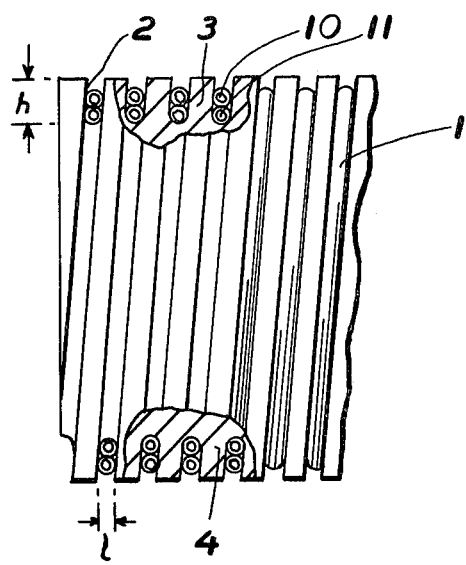
FIG. 1 is a schematic view of a phase of the method of preforming a flexible double tube according to the present invention.

One chooses for example, a double tube 1 of polyethylene about 11 meters long and which will then be cut, for example into 1 meter elements. The small side a of thus tube measures about 3 mm whereas the large side b is about twice the small side and consequently measures about 6 mm. One winds this double tube 1 in the helical groove 2 of a metal screw 3, 40 cm long and 55 mm diameter, the helical groove having a rounded bottom corresponding approximately to the shape of the tube. The depth h of this groove 2 is approximately equal to the large side b of the double tube 1 whereas its width 1 corresponds approximately to the small side a. The thickness of the wall limiting two adjacent turns is for example about 3 mm. One may of course, provide a thinner wall, for example 1 mm and likewise the screw may have other dimensions, notably, a greater length, for example 1 meter. The tube is thus wound on its edge as shown in FIG. 1 to form about 66 turns. Then the support with the tube is immersed in hot water at a temperature comprised between 85° and 95° C. for about 2 minutes for example (for polyethylene), then the tube with the support is dipped into cold water.

Figure 2:
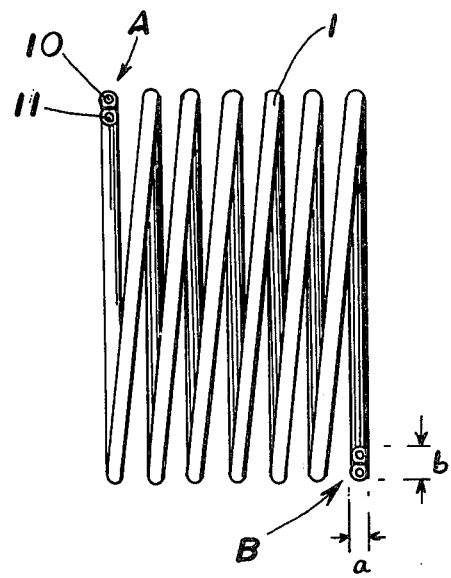
FIG. 2 is an elevational view of the double helically-preformed tube obtained after heating and separation from the screw.

The tube is then removed from the screw 3 and cut into elements each having six turns. One thus obtains a helix or coil as shown in FIG. 2. The height of the large side b is measurable along the diameter of the helix, and the width of the small side a is measurable along a line parallel to the axis of said helix. However, as illustrated in this figure, the turns of the helix do not apply against one another since the tube conserves the shape given to it by the screw, i.e. the turns are spaced apart from one another by a distance corresponding to the wall 4 comprised between two adjacent turns of the groove 2. So as to obtain a helically-wound tube having a minimum bulk and an increased elasticity, the direction of winding of the turns is reversed. To do this, the end A of the tube element 1 is passed inside the helix to come out by the other side. The ends A and B of the tube element are thus inverted and one obtains an axial prestressing force which applies the turns against one another. This prestressing force is all the greater as the distance between two adjacent turns of the screw groove is great. According to a preferred form of the invention, the thickness of the wall 4 comprised between two adjacent turns of the groove 2 is approximately equal to the width of this groove 2.

Figure 3:
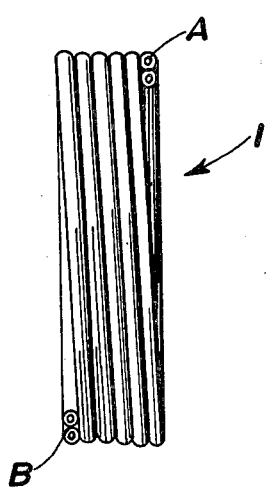
FIG. 3 is an elevational view of the double tube of which the direction of winding of the turns has been reversed in a manner to obtain a prestressing force.

One thus obtains a preformed tube element, as shown in FIG. 3, with its bulk reduced to the minimum since its length is equal to the number of turns multiplied by the small side or edge of the tube.

The choice of the temperature and time of the heat treatment depend of course on the chosen plastic. For a tube of nylon for example, the preforming is obtained by heating it to a temperature of 130° to 180° C., preferably 150° C., for 2 to 4 minutes. The heating may be provided by an oven, warm air, or by immersing the tube in an organic solution stable at this temperature, for example glycerine.

Moreover, it is not necessary to dip the tube after heating in a cold bath; the cooling can simply be obtained by allowing the treated tube to cool normally to the ambient temperature.

One may naturally envisage the application of this preforming method to tubes having more than two juxtaposed conduits, for example three or four; in this case, the advantage of reduced bulk is even more important.

In effect, a multiple conduit tube preformed according to the invention has in every instance a length determined by the dimension of its small side multipled by the number of turns, whatever be the number of conduits or the dimension of its large side respectively, since the joining line of the axes of all of the juxtaposed conduits is always along the direction of the diameter of the helix.

The flexible tube may naturally be in another material than polyethylene, for example, any other thermoplastic material; it may also be in nylon or other polyamides.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A flexible multi-conduit tube comprising:
   juxtaposed conduits having in cross-section a large side and a small side, the large side having a height defined by a plurality of said conduits, the small side having a width defined by a number of conduits which is less than the plurality of conduits defining said large side; and
   the conduits having a helical configuration in which the tube is wound on its small side, the height of the large side being measurable along the direction of the diameter of the helix.

2. The tube of claim 1 in which the flexible multi-conduit tube is a double tube for hydraulic body care apparatus 3. The tube of claim 1 in which the tube has been preformed into a helical configuration by winding it around the groove of a screw, subjecting it to the proper heat treatment, and thereafter cooling said tube.

4. The tube of claim 1 wherein the turns of the tube are applied against each other such that the length of the helix is substantially equal to the number of turns multiplied by the small side of the tube.

5. The tube of claim 1 in which the width of the small side is equal to the diameter of one conduit.

6. The tube of claim 1 in which an end of the tube is passed inside the helix to come out by the other side of said helix, the ends of the tube thereby being inverted to improve axial prestressing.

* * * * *